(12) United States Patent
Liao

(10) Patent No.: US 7,159,700 B2
(45) Date of Patent: Jan. 9, 2007

(54) COMPUTER PERIPHERAL WITH CABLE REELING DEVICE

(76) Inventor: Sheng Hsin Liao, No. 10, Alley 38, Lane 229, San Chun St., Shulin City, Taipei Hsien (TW)

( * ) Notice: Subject to any disclaimer, the term of this patent is extended or adjusted under 35 U.S.C. 154(b) by 0 days.

(21) Appl. No.: 10/779,715

(22) Filed: Feb. 18, 2004

(65) Prior Publication Data

US 2005/0178633 A1    Aug. 18, 2005

(51) Int. Cl.
*G09G 5/08*    (2006.01)

(52) U.S. Cl. ............................... 191/12.4; 191/12.2 R; 345/163

(58) Field of Classification Search .............. 191/12 R, 191/12.2 R, 12.4; 345/162–165, 160, 161, 345/168, 157, 167; 242/385, 379.2, 378.1, 242/378.2, 379; 361/600, 683; 439/501, 439/502

See application file for complete search history.

(56) References Cited

U.S. PATENT DOCUMENTS

| | | | | |
|---|---|---|---|---|
| 6,088,021 A * | 7/2000 | Yong | ........................... | 345/163 |
| 6,337,444 B1 * | 1/2002 | Liao | ........................... | 174/135 |
| 6,386,906 B1 * | 5/2002 | Burke | ........................ | 439/501 |
| 6,392,635 B1 * | 5/2002 | Snyder | ........................ | 345/163 |
| 6,452,108 B1 * | 9/2002 | Major | ........................ | 174/135 |
| 6,589,076 B1 * | 7/2003 | Davis et al. | ................. | 439/557 |
| 6,731,956 B1 * | 5/2004 | Hanna et al. | ............. | 455/569.1 |
| 6,909,046 B1 * | 6/2005 | Laity et al. | .................... | 174/50 |
| 7,023,424 B1 * | 4/2006 | Wei | .............................. | 345/163 |
| 7,029,322 B1 * | 4/2006 | Ernst et al. | .................. | 439/544 |
| 2003/0184521 A1 * | 10/2003 | Sugita | ......................... | 345/163 |
| 2005/0170686 A1 * | 8/2005 | Thorland et al. | ............ | 439/501 |

* cited by examiner

*Primary Examiner*—Mark T. Le
(74) *Attorney, Agent, or Firm*—Rosenberg, Klein & Lee

(57) ABSTRACT

A computer peripheral with cable reeling device has a reeling device and an input device. The reeling device has a housing and a communication cable extensibly retracted in the housing. The communication cable has an extractable end. The input device is detachably coupled with a front portion of the reeling device, and electrically connected with the reeling device. The reeling device can thereby couple with a computer peripheral and the communication cable is extendable. The reeling device can also be separated from the computer peripheral for independent use.

7 Claims, 8 Drawing Sheets

COMPUTER PERIPHERAL WITH CABLE REELING DEVICE

BACKGROUND OF THE INVENTION

1. Field of the Invention

The present invention relates to a computer peripheral with a cable reeling device, and particularly to an input device of computer peripheral combined with a cable reeling device for extending and rewinding a communication cable. The reeling device can be separated from the computer peripheral for independent use.

2. Description of the Prior Art

Use of any communication device, such as a computer, modem, telephone, or a fax machine, requires connection of a proper communication cable for transmission of electrical messages. Several types of cable reeling devices exist to allow such a communication cable to be sufficiently long for practical use while avoiding entanglement of the same. The cable reeling device basically comprises a housing, a communication cable, a reeling plate and a volute spring. A connector of the communication cable can thus connect with an associated communication device for providing transmission.

The inventor has applied for Patent Nos. 89220569, 89221465, and 91218754 in the R.O.C., which disclose 'A reeling box with enlarged using area'. The mentioned applications disclose a reeling box having a reel housing, a cable holder, and a communication cable. The cable holder has a first plate and a second plate. The communication cable is wound on a reeling shaft in a receiving cavity that are respectively formed on two sides of the first plate of the cable holder. The communication cable on the first plate is staggered, so that the reeling box has a significantly enlarged area of use for receiving a longer communication cable. The reeling box is more convenient, and the volume of the reeling box is effectively reduced for combination with a computer peripheral.

Additionally, to avoid the spring winding the communication cable too tightly in the reeling box such that the extended length thereof cannot remain constant, the inventor also discloses a reeling box with cable-fixing function. A switching plate mates with a cutout formed on a periphery of the housing of the reeling box and a hooking slot for fixing the communication cable after the same is extracted.

U.S. Pat. No. 6,088,021 discloses a peripheral input device having a reel assembly internally disposed in a peripheral input device, such as a mouse, or a pointing stick type peripheral input device, to allow the cord to be extended and retracted between a first length and second length. However, the reel assembly is fixedly installed in the peripheral input device and cannot be used independently. The use of the reel assembly is thus limited so as to have no other uses.

Consequently, it would be advantageous to provide a peripheral input device with a dismountable cable-reeling device for extending the use of reel assembly.

SUMMARY OF THE INVENTION

Accordingly, the present invention is directed to a peripheral input device with a cable reeling device, so that the cable can be extended and retracted, and the cable reel assembly is dismountable from the computer peripheral. The cable reeling device can be used independently, thus extending the use of the reel assembly.

In order to achieve the above object, the present invention provides a computer peripheral with a cable reeling device having a reeling device, and an input device. The reeling device has a housing and a communication cable extensibly retracted in the housing. The communication cable has an extractable end. The input device is detachably coupled with a front portion of the reeling device, and electrically connected to the reeling device. The reeling device can thereby couple with a computer peripheral and the communication cable is extendable, and the reeling device can be separated from the computer peripheral for independent use.

BRIEF DESCRIPTION OF THE DRAWINGS

Other objects, advantages and novel features of the present invention will become more apparent from the following detailed description of the present embodiment when taken in conjunction with the accompanying drawings, in which.

DESCRIPTION OF THE PREFERRED EMBODIMENT

Figure 1:
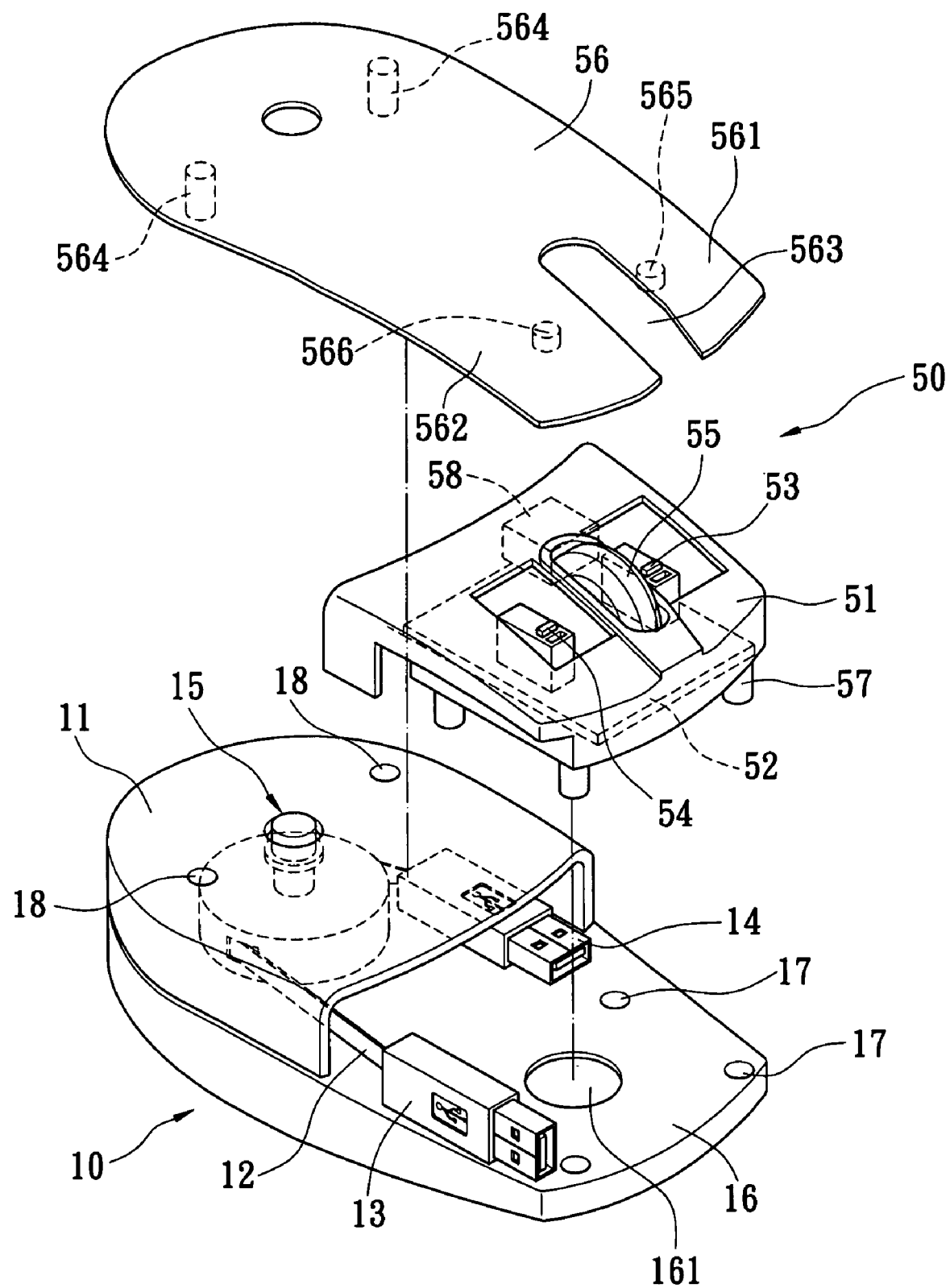
FIG. 1 is a perspective exploded view of first embodiment according to the present invention.
Figure 2:
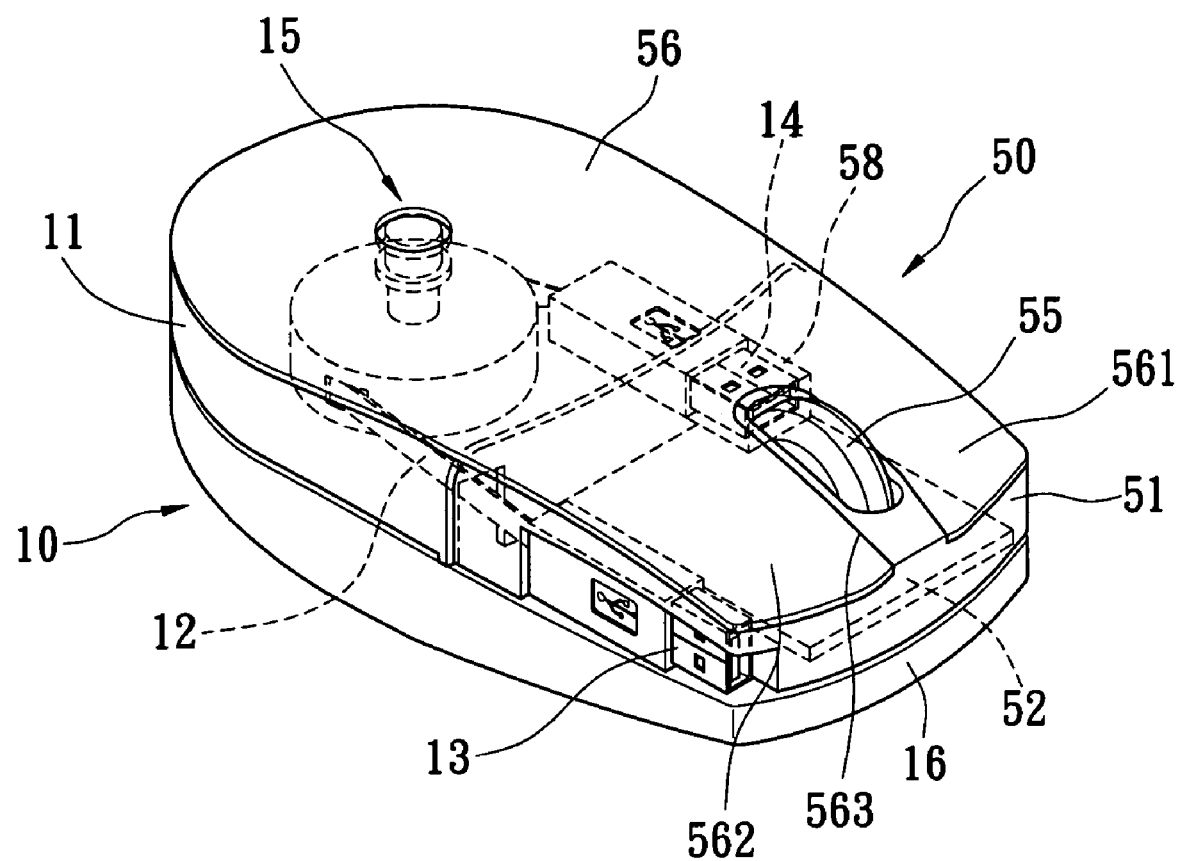
FIG. 2 is a perspective assembled view of first embodiment according to the present invention.

Referring to FIGS. 1 and 2, a computer peripheral with cable reeling device is shown. In this embodiment, the computer peripheral, the input device, is a mouse. The computer peripheral with cable reeling device comprises a reeling device 10 and an input device 50. The reeling device 10 has a housing 11 and a communication cable 12 extensibly wound in the housing 11. The form of the housing 11 is not limited and is changeable according to actual need. The cable 12 utilizes a volute spring and has kinetic energy to be extensibly wound in the housing 11. The housing 11 extends with a receiving portion 16 for receiving the input device 50. The receiving portion 16 is formed with a through hole 161 for a light emitted from the input device 50 of an optical input device to pass therethrough.

The communication cable 12 has two ends respectively connecting with a first connector 13 and a second connector 14. The first and second connectors 13, 14 are USB-type connectors or another type of connector. At least one end of the communication cable 12 is an extractable end. In this embodiment, the end connecting with the first connector 13 is the extractable end and the communication cable 12 can be drawn out from the first connector 13 to mate with a socket of a computer host for electrically connecting the computer peripheral and the host.

The reeling device 10 has a switch unit 15 for controlling drawing out the communication cable 12 with one end or two ends. The switch unit 15 can control drawing out of the communication cable 12 from the end with the first connector 13 or from both ends (from the first connector 13 and the second connector 14). The switch unit 15 is disclosed in R.O.C. Patent Application Nos. 89220569, 89221465, and 91218754, and so is not mentioned in further detail here.

The input device 50 is detachably coupled with a front portion of the reeling device 10 and electrically connected with the reeling device 10. The input device 50 can be an optical or mechanical input device. The input device 50 has a main body 51, and an upper shell 56 disposed on the main body 51. The main body 51 has a circuit unit 52 mounted therein. The upper shell 56 has a left button 561 mounted thereon, a right button 562 mounted thereon, and a cutout 563 formed thereon. The main body 51 and the upper shell 56 are engaged with the reeling device 10. The circuit unit 52 has a left button switch 53 mating with the left button 561, a right button switch 54 mating with the right button 562, a wheel 55 exposed outside the upper shell 56 from the cutout 563, and a third connector 58.

The input device 50 is assembled on the receiving portion 16 of the reeling device 10 via the main body 51. The main body 51 is formed with a plurality of posts 57 on a bottom thereof. The posts 57 are engaged with corresponding engaging holes 17 formed on the housing 11 of the reeling device 10, and therefore the main body 51 of the input device 50 is dismountably assembled on a front portion of the reeling device 10. The third connector 58 of the input device 50 is plugged with the second connector 14 of the communication cable 12 for electrical connection. The upper shell 56 has a pair of posts 564 protruding from a bottom side of a rear portion, and a pair of touch-rods 565, 566 respectively formed under the left and right buttons 561, 562. The posts 564 are engaged within corresponding engaging holes 18 formed in the housing 11 of the reeling device 10 for dismountable assembly on the reeling device 10. The pair of touch-rods 565, 566 respectively touch the left button switch 53 or the right button switch 54 when the user presses the left button 561 or the right button 562.

Figure 3:
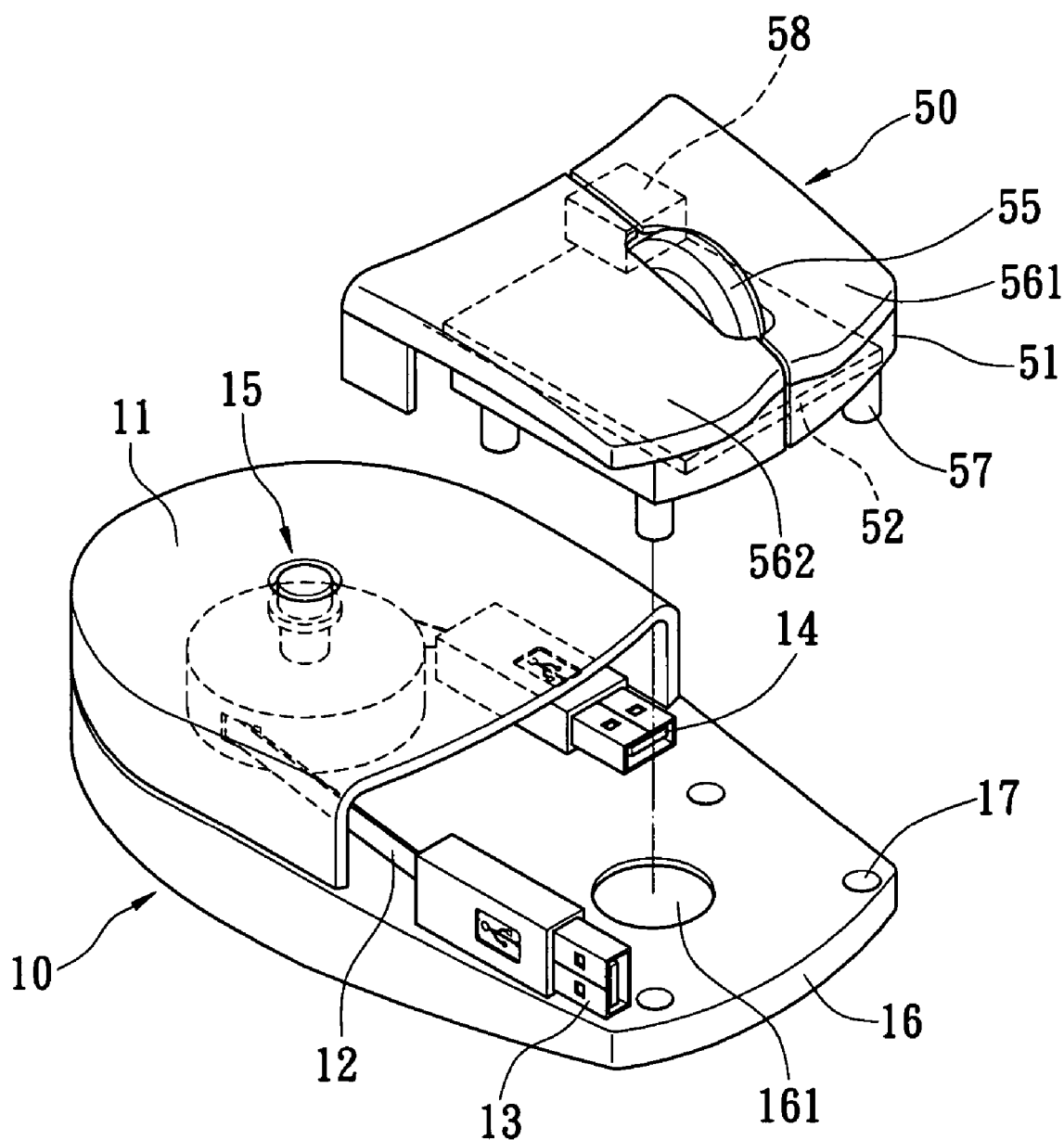
FIG. 3 is a perspective exploded view of second embodiment according to the present invention.
Figure 4:
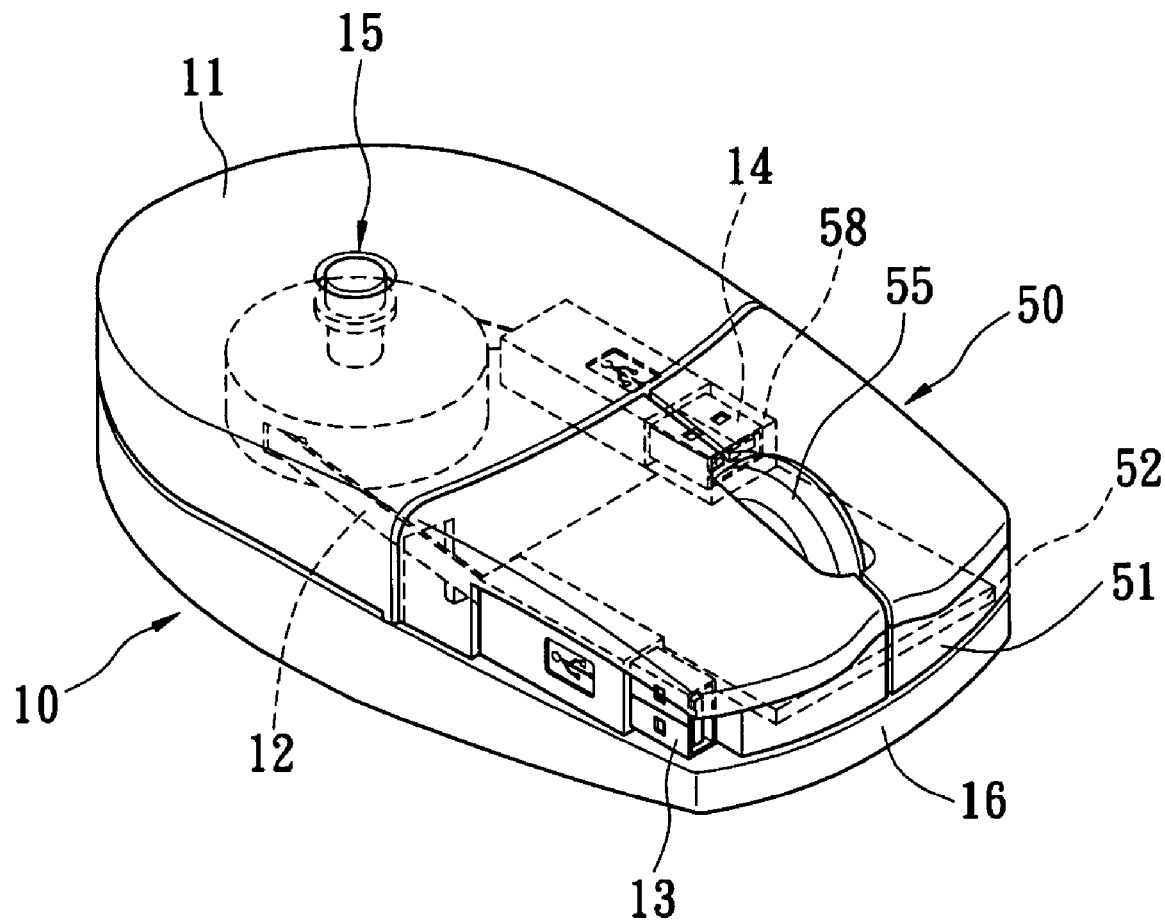
FIG. 4 is a perspective assembled view of second embodiment according to the present invention.

Referring to FIGS. 3 and 4, different embodiments of the input device are shown. The input device 50 has a main body 51 engaged with the reeling device 10. The main body 51 has a circuit unit 52 mounted therein, left and right buttons 561, 562 mounted thereon, and a wheel 55 mounted between the left and right buttons 561, 562. The input device 50 is an optical or mechanical kind mouse. The main body 51 is formed with a plurality of posts 57 on a bottom thereof for respectively engaging with corresponding engaging holes 17 formed in the housing 11 of the reeling device 10.

Figure 5:
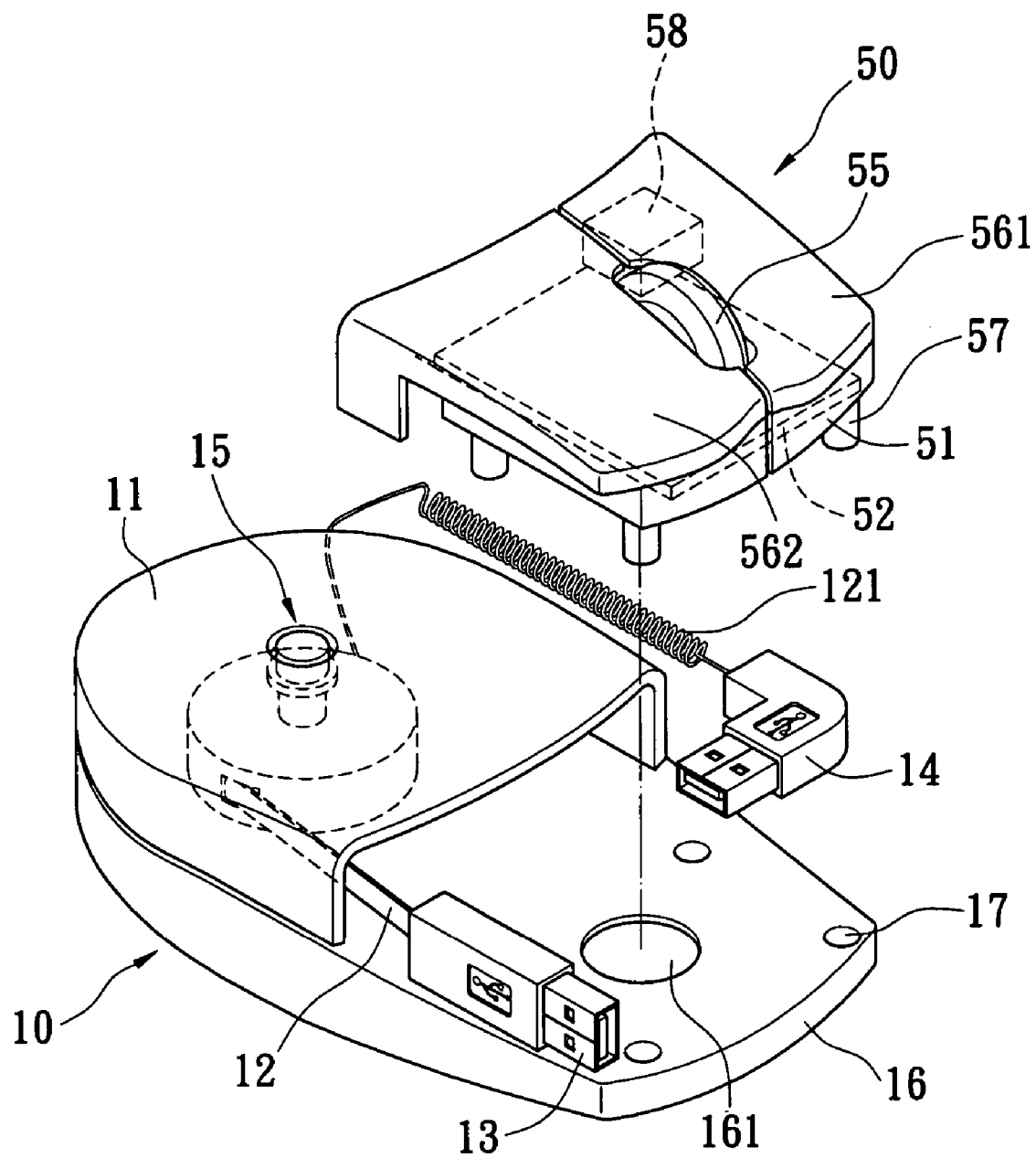
FIG. 5 is a perspective exploded view of third embodiment according to the present invention.
Figure 6:
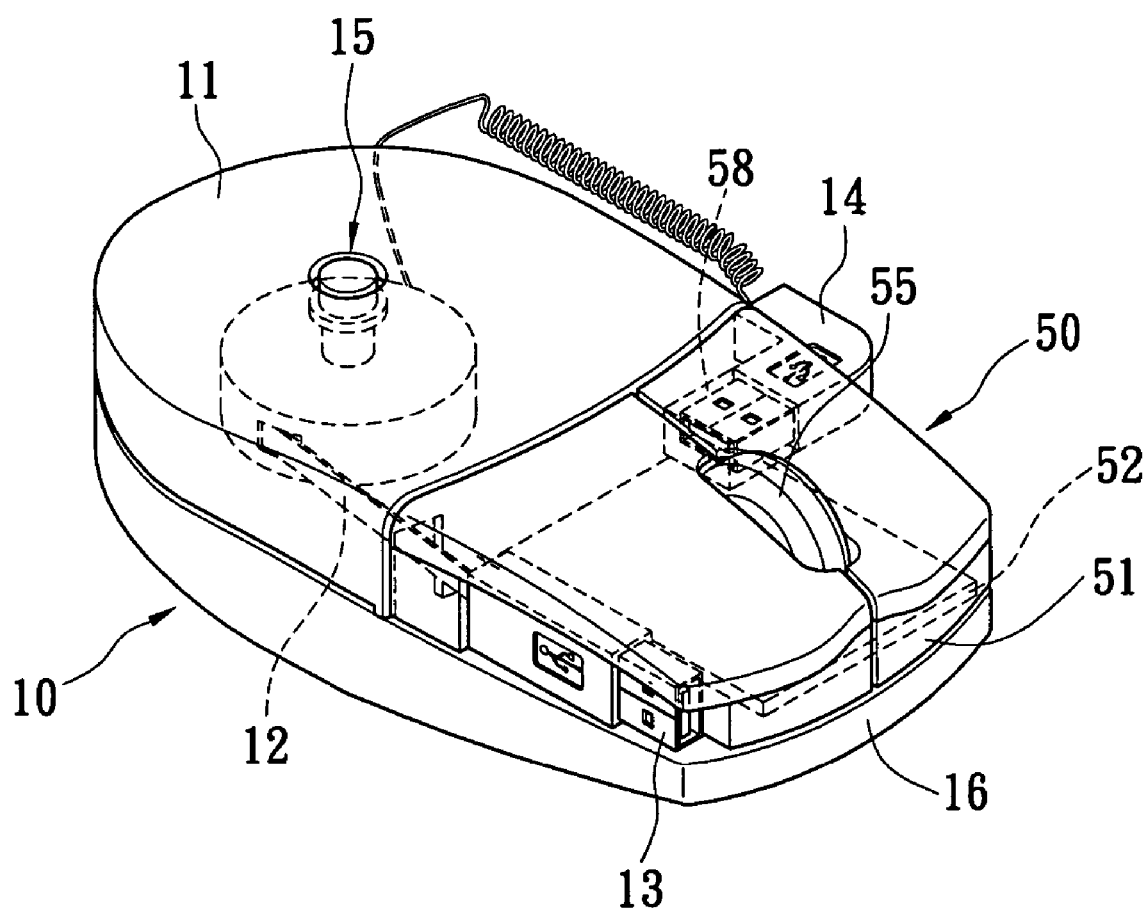
FIG. 6 is a perspective assembled view of third embodiment according to the present invention.

Referring to FIGS. 5 and 6, different embodiments of the input device are shown. One end of the communication cable 12 is connected with a predetermined length of an extendible cable 121, and the second connector 14 is connected with another end of the extendible cable 121. The second connector 14 can be drawn out to plug conveniently into the third connector 58 of the input device 50, or plug into another socket of another kind communication device.

Figure 7:
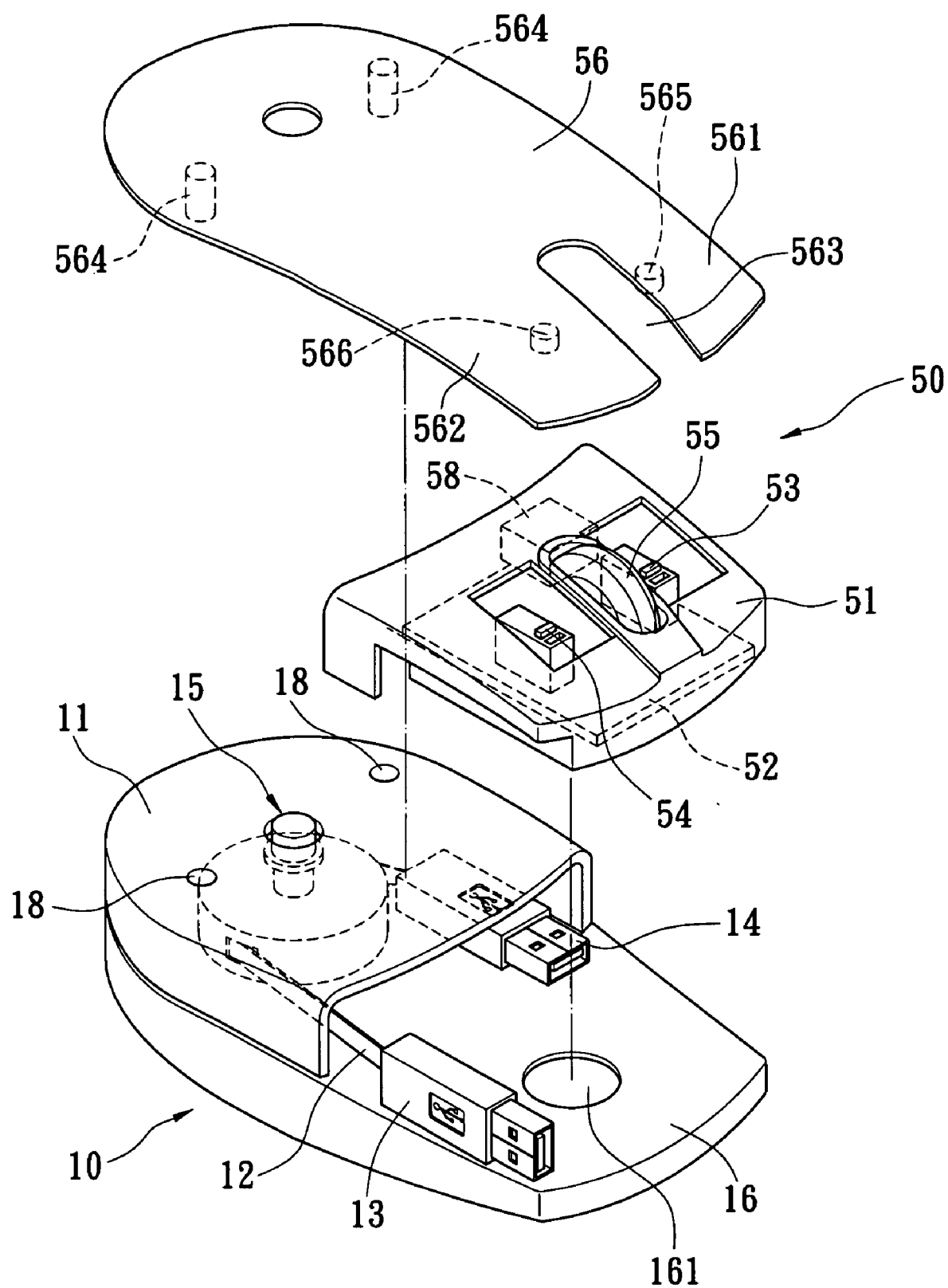
FIG. 7 is a perspective exploded view of fourth embodiment according to the present invention.

Referring to FIG. 7, another combined embodiment of the computer peripheral with cable reeling device is shown. The main body 51 of the input device 50 is disposed on the receiving portion 16 of the reeling device 10 and uses the second connector 14 to plug into the third connector 58 of the input device 50 for combination with the reeling device 10.

Figure 8:
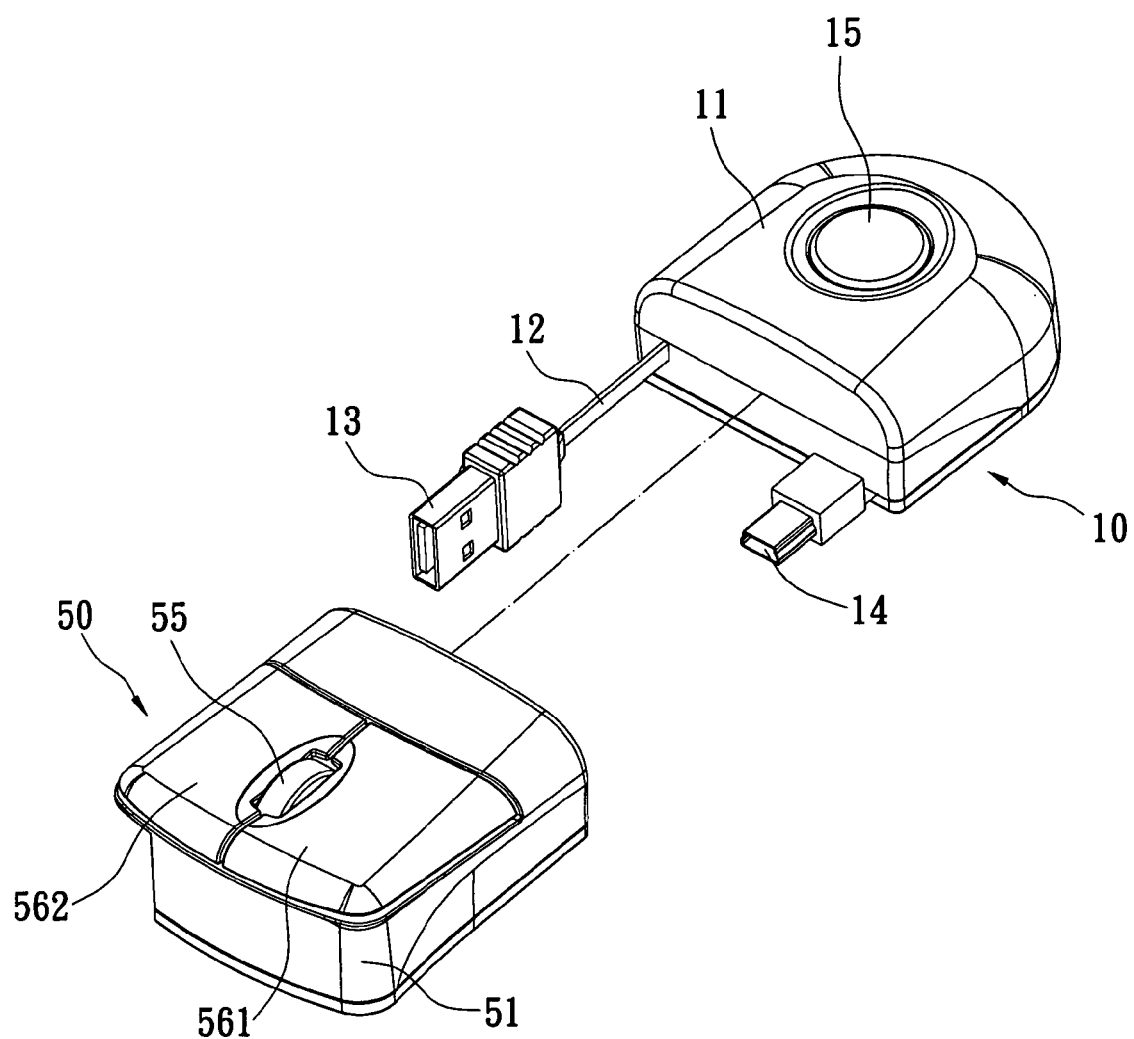
FIG. 8 is a perspective exploded view of fifth embodiment according to the present invention.

Referring to FIG. 8, another embodiment of the cable reeling device is shown. The receiving portion 16 of the reeling device 10 is omitted.

In conclusion, the present invention combines the cable reeling device 10 with a computer peripheral (a peripheral input device 50), so that the cable 12 can be extended and retracted to allow cable 12 to be sufficiently long for practical use but not become tangled.

The cable reeling device 10 connects to the computer peripheral 50 in a dismountable way, so the cable reeling device 10 can be used independently with, for example, a computer, a modem, a telephone, or a fax machine, thus expanding the use of the reeling device.

It is to be understood, however, that even though numerous characteristics and advantages of the present invention have been set forth in the foregoing description, together with details of the structure and function of the invention, the disclosure is illustrate only, and changes may be made in detail, especially in matters of shape, size, and arrangement of parts within the principles of the invention to the full extent indicated by the broad general meaning of the terms in which the appended claims are expressed.

What is claimed is:

1. A computer peripheral with cable reeling device, comprising:
a cable reeling device having a housing and a communication cable wound in a first portion of said housing, said communication cable including a first end and a second end respectively connecting with a first connector and a second connector, said communication cable being wound with at least said first end being retractably extendable from said housing, said housing having a receiving space formed in a second portion thereof, said second portion of said housing being disposed adjacent to said first portion of said housing; and
a mouse device detachably coupled to said housing in said receiving space, said mouse device having a third connector electrically connected to said second connector, said mouse device being separable from said housing and said third connector being disconnected from said second connector, wherein said cable reeling device is then independently operable to electrically couple anyone of a plurality of peripheral devices to a computer.

2. The computer peripheral with cable reeling device as claimed in claim 1, wherein the receiving portion of the housing has a through hole formed therein, and the mouse device has a position sensor aligned with said through hole.

3. The computer peripheral with cable reeling device as claimed in claim 1, wherein the first connector, the second connector and the third connector are USB connectors.

4. The computer peripheral with cable reeling device as claimed in claim 1, wherein the reeling device has a switch unit for controlling drawing out of the communication cable with one end or two ends.

5. The computer peripheral with cable reeling device as claimed in claim 1, further comprising an upper cover overlaying said housing, said upper cover being releasably coupled to said first portion of said housing and extending over said receiving space and defining operable buttons depressible to operate corresponding switches of said mouse device.

6. The computer peripheral with cable reeling device as claimed in claim 5, wherein said mouse device and the upper cover are each formed with a respective plurality of posts on a bottom portion thereof, said posts being respectively releasably engaged with corresponding engaging holes formed in the housing.

7. The computer peripheral with cable reeling device as claimed in claim 1, wherein the mouse device is formed with a plurality of posts on a bottom portion thereof for respective releasable engagement with corresponding engaging holes formed in the receiving portion of said housing.

* * * * *